United States Patent Office 2,915,266
Patented Dec. 1, 1959

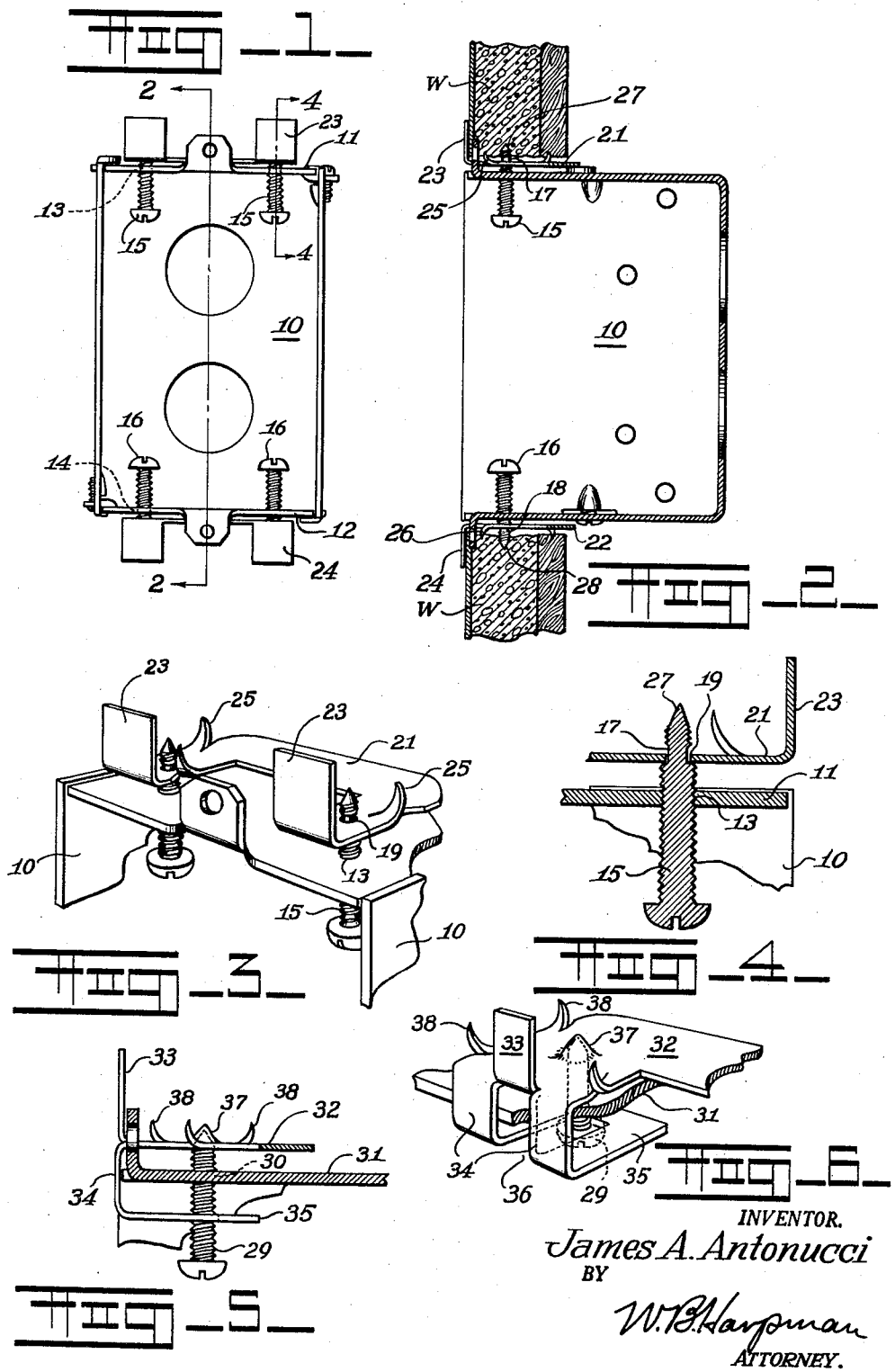

2,915,266

CLAMPING DEVICE FOR OUTLET BOXES

James A. Antonucci, Youngstown, Ohio

Application March 2, 1956, Serial No. 569,100

2 Claims. (Cl. 248—27)

This invention relates to an electrical outlet box and more particularly to a clamping device incorporated therewith for clamping the outlet box in an opening in a wall.

The principal object of the invention is the provision of a simple and efficient clamping device for securing an outlet box in an opening in a wall.

A further object of the invention is the provision of a clamping device for an outlet box that may be inexpensively formed and readily attached to an outlet box without modifying the structure of the box.

A still further object of the invention is the provision of a clamping device for an outlet box which may be actuated from within the box.

A still further object of the invention is the provision of a clamping device for an outlet box that may be attached to the outlet box and retained thereon until such time as the outlet box is used.

The outlet box and the clamping device therefore disclosed herein comprises an improvement in the art relating to such structures which are intended to facilitate the installation of electrical outlet boxes in openings formed in various wall structures, for example, at such time as an electrical convenience outlet is installed in a lath and plaster wall of a dwelling house.

Those skilled in the art will recognize that many and various forms of clamping devices have been proposed, the majority of which necessitated the formation of a special outlet box for the reception or retention of the clamping device.

The present disclosure relates to a clamping device which may be attached to a conventional outlet box such as regularly manufactured and distributed by many different manufacturers as it engages the outlet box by means already provided in the outlet box: to wit; the spaced tapped openings in the upper and lower portion of the box by means of which the conventional flange member, sometimes used on the top and bottom of the box, is attached thereto.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a front view of an outlet box illustrating a preferred form of the clamping means.

Figure 2 is a vertical section taken on line 2—2 of Figure 1.

Figure 3 is an enlarged perspective detail of a portion of an outlet box and clamping device secured thereto.

Figure 4 is a vertical section taken on line 4—4 of Figure 1.

Figure 5 is a vertical section through the top portion of an outlet box illustrating a portion of a modified form of clamping device positioned on the top thereof.

Figure 6 is a perspective view of a portion of said modified clamping device including a portion of the top of an outlet box on which the same is mounted.

By referring to the drawing and Figures 1 through 4 in particular it will be seen that the preferred embodiment of the invention is disclosed in connection with an outlet box 10 having a top 11 and bottom 12, the top 11 and bottom 12 having transversely spaced drilled and tapped openings 13 and 14, respectively therein, as best shown in Figure 4 of the drawing in which bolts 15 and 16 are respectively positioned.

The bolts 15 are positioned in inverted position through the top 11 with their heads in the outlet box 10 and the bolts 16 are positioned in upright position with their heads in the outlet box 10 and extend downwardly through the bottom 12 thereof.

A pair of the bolts 15 is employed in the top of the box and a pair of the bolts 16 is employed in the bottom of the box and both pairs of the bolts 15 and 16 have unthreaded areas near their ends, which unthreaded areas are indicated by the numerals 17 and 18 respectively, as best seen in Figure 2 of the drawings, and engaged in openings 19 and 20 respectively in oppositely disposed clamping pieces 21 and 22.

The clamping pieces 21 and 22 are identical in size and shape but are employed in oppositely disposed relation. Each of the clamping pieces 21 and 22 has a pair of vertically extending end portions 23 and 24 which are adapted to overlie the face of a wall such as shown in Figure 2 of the drawing and indicated by the letter W.

Each of the clamping pieces 21 and 22 has a plurality of upturned sharp barbs 25 and 26 formed thereon and the outermost ends of the bolts 15 and 16 are pointed as at 27 and 28 so that when the bolts 15 and 16 are rotated after the outlet box 10 has been positioned in an opening in the wall W, the clamping pieces 21 and 22 are moved upwardly and downwardly away from the bottom of the outlet box 10 and into clamping engagement with the cutaway area of the wall W which defines the opening in which the outlet box 10 is positioned.

As the bolts 15 and 16 are revolved, the areas 17 and 18, of smaller diameter thereon, move the horizontal and vertical portions of the clamping pieces 21 and 22 into clamping engagement with the wall with the barbs 25 and 26 and the pointed ends 27 and 28 of the bolts 15 and 16 forcibly engaging the adjacent wall surfaces thereby firmly mounting the outlet box 10 in the opening in the wall.

It will occur to those skilled in the art that the preferred embodiment of the invention just described is dependent in operation upon the provision of the specially formed bolts 15 and 16 and it will also occur to those skilled in the art that conventional bolts or screws may be used with a modification of the device such as illustrated in Figures 5 and 6 of the drawings wherein conventionally formed bolts or screws 29 may be threadably engaged in the threaded openings 30 regularly provided in conventional outlet boxes 31 and modified forms of clamping pieces used in connection therewith so as to be moved outwardly thereby from the outlet box 31.

As disclosed in Figures 5 and 6 of the drawing, the modified form of clamping device comprises a horizontally disposed generally U-shaped member 32 provided at its forward end with upwardly turned flanges 33 and downwardly turned flanges 34, the ends of the downwardly turned flanges 34 being turned inwardly on a horizontal plane as at 35 with the space between the flanges 34 defining a slot 36 through which the conventionally formed bolt or screw 29 is positioned with the head thereof lying below the inturned ends 35 and downwardly turned flanges 34.

It will be undestood that the clamping device 32 includes two upturned flanges 33 which compare in size and disposition with respect to the outlet box 31 with the upturned flanges 23 of the form of the invention illustrated in Figures 1 through 4 of the drawing. The clamping device 32 includes two pairs of the downwardly turned flanges 34, each of which defines a slot 36 and thereby accommodates two conventional bolts 29 positioned in the two regularly threaded openings 30 in the top and in the bottom of the outlet box.

Each of the modified clamping devices 32 has an indentation 37 formed therein from below, the uppermost part of the indentation comprising an upstanding boss which may be pointed, if desired, and which will cooperate with a plurality of upturned barbs 38 also formed of the material of the clamping device 32.

It will thus be observed that when the regular bolts or screws 29 are turned in the threaded openings 30 of the top 31 (or alternately in the bottom, not shown) of the outlet box, they will move the clamping devices 32 away from the box and into engagement with the adjacent surfaces of the opening in the wall in which the box is disposed.

It will thus be seen that the modification of the clamping device shown in Figures 5 and 6 of the drawing is substantially similar to that shown in Figures 1 through 4 (and heretofore described) with the exception that the areas which are solely upturned to form the flanges 23 in Figures 1 through 4 are increased in width and partially downturned and slotted to form the modification which in effect cages the bolt or screw 29 and permits the use of a conventional bolt or screw rather than a special bolt or screw 15 or 16 as necessary in the preferred form of the invention.

It will thus be seen that the clamping device for outlet boxes described herein meets the several objects of the invention.

Having thus described my invention, what I claim is:

1. A device for use in clamping an outlet box having threaded openings in its top portion in an opening in a wall, said device comprising a horizontally disposed member adapted to be positioned on the top of said outlet box, said member having a pair of transversely spaced downturned and inturned flanges on one of its ends adapted to overly spaced areas of the front edge of the top of the outlet box on which the device is positioned, an area of each of said downturned and inturned flanges being cut away and forming upturned flanges, spaced upturned barbs formed on said member in spaced relation to said upturned flanges and headed bolts positioned upwardly through said cut away areas of said downturned and inturned flanges and engaged in said threaded openings in said outlet box and engaged against the bottom surface of said member so that when said bolts are rotated in one direction they will move said member away from said outlet box.

2. The device for use in clamping an outlet box in an opening in a wall set forth in claim 1 and wherein said horizontally disposed member has indentations formed upwardly therein from the bottom thereof in which the ends of said bolts register.

References Cited in the file of this patent

UNITED STATES PATENTS

| | | |
|---|---|---|
| 2,315,746 | Stewart | Apr. 6, 1943 |
| 2,562,344 | Tranas | July 31, 1951 |
| 2,578,008 | Judd | Dec. 11, 1951 |
| 2,611,501 | Bermann | Sept. 23, 1952 |
| 2,757,817 | Egan | Aug. 7, 1956 |
| 2,771,262 | Laystrom | Nov. 20, 1956 |

OTHER REFERENCES

Garcy Reflectors—Bulletin—35–100. Received Jan. 28, 1936.